United States Patent
Kusumoto

(10) Patent No.: US 8,667,453 B2
(45) Date of Patent: Mar. 4, 2014

(54) POWER-SUPPLY DESIGN SYSTEM, POWER-SUPPLY DESIGN METHOD, AND PROGRAM FOR POWER-SUPPLY DESIGN

(75) Inventor: Manabu Kusumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/811,886

(22) PCT Filed: Jun. 20, 2011

(86) PCT No.: PCT/JP2011/064039
§ 371 (c)(1),
(2), (4) Date: Jan. 23, 2013

(87) PCT Pub. No.: WO2012/014597
PCT Pub. Date: Feb. 2, 2012

(65) Prior Publication Data
US 2013/0125083 A1 May 16, 2013

(30) Foreign Application Priority Data
Jul. 30, 2010 (JP) .................................. 2010-172596

(51) Int. Cl.
*G06F 17/50* (2006.01)

(52) U.S. Cl.
USPC .......................................... 716/136; 716/135

(58) Field of Classification Search
USPC .................................................. 716/132–136
See application file for complete search history.

(56) References Cited

U.S. PATENT DOCUMENTS

| | | | |
|---|---|---|---|
| 2002/0120906 A1* | 8/2002 | Xia et al. ........................... | 716/2 |
| 2006/0230365 A1* | 10/2006 | Bromberger ...................... | 716/2 |
| 2008/0066038 A1 | 3/2008 | Masumura | |
| 2009/0033389 A1* | 2/2009 | Abadeer et al. ............... | 327/161 |
| 2009/0248343 A1 | 10/2009 | Kashiwakura | |
| 2012/0059614 A1 | 3/2012 | Kashiwakura | |

FOREIGN PATENT DOCUMENTS

| | | |
|---|---|---|
| JP | 3609305 B2 | 1/2005 |
| JP | 2007-133484 A | 5/2007 |
| JP | 2008-070924 A | 3/2008 |
| JP | 2009-230694 A | 10/2009 |

OTHER PUBLICATIONS

International Search Report in PCT/JP2011/064039 dated Sep. 13, 2011 (English Translation Thereof).
Smith, L.D., et al., Power Distribution system design methodology and capacitor selection for modern CMOS technology, IEEE Transactions on Advanced Packaging, vol. 22, No. 3, IEEE, Aug. 1999, pp. 284-291.

* cited by examiner

*Primary Examiner* — Binh Tat
(74) *Attorney, Agent, or Firm* — McGinn Intellectual Property Law Group, PLLC

(57) ABSTRACT

A power-supply design system for designing a power supply of electronic equipment apparatuses. The system includes an input device for inputting circuit information about the power supply of the electronic equipment apparatus; a current deviation computation unit that computes an electric current deviation which indicates electric current variation of the electronic equipment apparatus, based on the circuit information input using the input device, and dispersion information that indicates a dispersion of an electric current variation, which corresponds to the circuit information; a target impedance computation unit that computes a target impedance as a target for the power supply indicated by the circuit information, based on the electric current deviation computed by the current deviation computation unit and a permissible range of a voltage variation, where the permissible range is indicated by the circuit information; and an output device that outputs the target impedance computed by the target impedance computation unit.

20 Claims, 7 Drawing Sheets

POWER-SUPPLY DESIGN SYSTEM, POWER-SUPPLY DESIGN METHOD, AND PROGRAM FOR POWER-SUPPLY DESIGN

TECHNICAL FIELD

The present invention relates to a power-supply design system and the like, which are used as tools for designing a power supply of an electronic equipment apparatus, and in particular, relates to a power-supply design system, a power-supply design method, and a power-supply design program for supporting power-supply design by employing a random model in accordance with an outline of an operation circuit in an upper process during design so as to output statistical values for power-supply variation.

Priority is claimed on Japanese Patent Application No. 2010-172596, filed Jul. 30, 2010, the contents of which are incorporated herein by reference.

BACKGROUND ART

Recently, owing to significant advance in semiconductor techniques, performance and operation speed of electronic equipment apparatuses such as LSI (Large Scale Integration) have been improved. Therefore, costs required for designing and verifying a power supply of each electronic equipment apparatus have also increased.

In order to reduce the power-supply design cost for electronic equipment apparatuses, verification performing a simulation for electronic equipment apparatuses has been actively pursued at the phase of design. It is possible to evaluate a superior or inferior power-supply design for electronic equipment apparatuses by analyzing such verification using the simulation, thereby solving a problem in that power-supply redesigning must be performed after making a preproduction sample of an electronic equipment apparatus. Accordingly, it is possible to reduce the power-supply design cost for the electronic equipment apparatus.

In addition, various kinds of technique for supporting the power-supply design for electronic equipment apparatuses by employing simulation have been disclosed.

In an example of the disclosure, in order to cancel a multipath phasing phenomenon in which multiple waves through different transmission paths interfere with each other that degrades received waves, an impedance of the power supply is computed in advance by simulation, so as to determine the presence or absence of resonance in the power supply and support the design thereof (see, for example, Patent-Document 1).

In another example of the disclosure, design support is performed by adjusting the model of simulation due to the measurement of a power-supply circuit of an electronic equipment apparatus (see, for example, Patent-Document 2).

In another example of the disclosure, appropriate design supporting is performed by producing an analysis model by using lots of design information items for an electronic equipment apparatus, and determining decoupling capacitance which is required for arranging capacitors in a power-supply circuit and is one of the important elements for the power-supply design (see, for example, Patent-Document 3).

Additionally, it is very important in the power-supply design of an electronic equipment apparatus to suppress variation in the voltage of the relevant power supply.

More specifically, when a working part of the electronic equipment apparatus operates in various ways, electric current flows from the power supply. Here, the working part of the electronic equipment apparatus consists of many electronic components such as an LSI, and each circuit of the electronic equipment apparatus is activated or inactivated according to the working state of each electronic component, so that the current which flows through the working part varies according to the number of circuits that work at different values of timing. Such a current variation causes a variation in the voltage of the power supply. In consideration thereof, optimum power-supply design is performed in which the variation in the voltage of the power supply is analyzed so as to supply a stable power-supply voltage.

PRIOR ART DOCUMENT

Patent Document

Patent Document 1: Japanese Patent Publication No. 3609305
Patent Document 2: Japanese Unexamined Patent Application, First Publication No. 2007-133484.
Patent Document 3: Japanese Unexamined Patent Application, First Publication No. 2008-70924.

DISCLOSURE OF INVENTION

Problem to be Solved by the Invention

However, in the upper design process in which no detailed working state of each electronic equipment apparatus has not yet been determined, it is very difficult to execute the design by using simulation.

In conventional techniques, simulation is performed based on detailed design data, or as disclosed in the above-described Patent-Document 2, simulation is executed after obtaining measurement data using an actual electronic equipment apparatus. However, the upper design process cannot obtain information required for the simulation. Therefore, in the present conditions, no appropriate simulation can be performed in the upper design process for which design using simulation is effective.

In addition, since actual electronic equipment apparatuses perform complex operations, it is very difficult to execute a simulation which reliably follows the operation of each electronic equipment apparatus.

More specifically, in order to simulate the state of electric current variation due to actual complex operation of each electronic equipment apparatus, the model itself is considerably complex so that a huge amount of computation is necessary to analyze the simulation.

In consideration thereof, currently, simulation is performed by assuming, for example, iteration of a simple operation. In this case, only a few operations of each electronic equipment apparatus can be considered, where any phenomenon which occurs non-frequently in the electronic equipment apparatus is not considered in the power-supply design. Therefore, no power supply having a high quality can be designed.

The above-described Patent-Documents 1 to 3 do also not perform simulation in consideration of all operations of the relevant electronic equipment apparatus, and thus cannot design a power supply having high quality.

In light of the above problems, an object of the present invention is to provide a power-supply design system, a power-supply design method, and a power-supply design program, which support the power-supply design by outputting target impedance as a target of simulation in the upper design process.

Means for Solving the Problem

In order to solve the above problems, the present invention provides a power-supply design system used for designing a power supply of an electronic equipment apparatus, the system comprising:

an input device used for inputting circuit information about the power supply of the electronic equipment apparatus;

a current deviation computation unit that computes an electric current deviation which indicates an electric current variation of the electronic equipment apparatus, based on the circuit information input using the input device, and dispersion information that indicates a dispersion of an electric current variation, which corresponds to the circuit information;

a target impedance computation unit that computes a target impedance as a target for the power supply indicated by the circuit information, based on the electric current deviation computed by the current deviation computation unit and a permissible range of a voltage variation, where the permissible range is indicated by the circuit information; and an output device that outputs the target impedance computed by the target impedance computation unit.

The present invention also provides a power-supply design system used for designing a power supply of an electronic equipment apparatus, the system comprising:

an input device used for inputting circuit information about the power supply of the electronic equipment apparatus;

a variance storage unit that stores variance information which indicates an occurrence probability for electric current within a variation range of the electric current;

a current deviation computation unit that computes an electric current deviation which indicates an electric current variation of the electronic equipment apparatus, based on the variance information and an electric current occurrence range indicated by the circuit information input using the input device;

a target impedance computation unit that computes a target impedance as a target for the power supply, based on the electric current deviation computed by the current deviation computation unit and a permissible range of a voltage variation of the electronic equipment apparatus, where the permissible range is indicated by the circuit information; and an output device that outputs the target impedance computed by the target impedance computation unit.

Each of the above power-supply design systems may further comprise:

an impedance computation unit that computes power-supply impedance characteristics of the power supply of the electronic equipment apparatus, based on the circuit information input using the input device; and a determination unit that determines, based on the target impedance computed by the target impedance computation unit, whether or not a power-supply impedance computed based on the power-supply impedance characteristics is within a permissible range indicated by the target impedance, wherein based on a result of the determination by the determination unit, the output device outputs information that indicates whether or not the power-supply impedance is within a permissible range for the circuit information.

In this case, the system may further comprise:

a component addition or replacement unit that performs a control such as addition or replacement of a component which forms the electronic equipment apparatus and corresponds to the circuit information if the power-supply impedance is not within the permissible range for the circuit information, so that the power-supply impedance is within the permissible range for the circuit information, wherein according to a result of the control by the component addition or replacement unit, the output device outputs power-supply design information about design control required for the power-supply impedance to be within the permissible range for the circuit information.

The present invention also provides a power-supply design method used for designing a power supply of an electronic equipment apparatus, the method comprising:

a first step that inputs circuit information about the power supply of the electronic equipment apparatus;

a second step that computes an electric current deviation which indicates an electric current variation of the electronic equipment apparatus, based on the circuit information and dispersion information that indicates a dispersion of an electric current variation, which corresponds to the circuit information;

a third step that computes a target impedance as a target for the power supply indicated by the circuit information, based on the electric current deviation and a permissible range of a voltage variation, where the permissible range is indicated by the circuit information; and a fourth step that outputs the target impedance.

The present invention also provides a power-supply design method used for designing a power supply of an electronic equipment apparatus, the method comprising:

a first step that inputs circuit information about the power supply of the electronic equipment apparatus;

a second step that computes an electric current deviation which indicates an electric current variation of the electronic equipment apparatus, based on variance information which indicates an occurrence probability for electric current within a variation range of the electric current, and on an electric current occurrence range indicated by the circuit information;

a third step that computes a target impedance as a target for the power supply, based on the electric current deviation and a permissible range of a voltage variation of the electronic equipment apparatus, where the permissible range is indicated by the circuit information; and a fourth step that outputs the target impedance.

The present invention also provides power-supply design programs for executing the first to fourth steps of the respective power-supply design methods.

Effect of the Invention

In accordance with the present invention, current deviation can be obtained based on a statistical electric current range that is defined by assumed maximum and minimum currents. Therefore, it is possible to compute a target impedance by means of the current deviation and a target permissible value for voltage variation.

In addition, since the target impedance can be clearly set, power-supply design can be performed with an appropriate cost, thereby reducing the design cost for a power supply in an electronic equipment apparatus.

MODE FOR CARRYING OUT THE INVENTION

Figure 1:
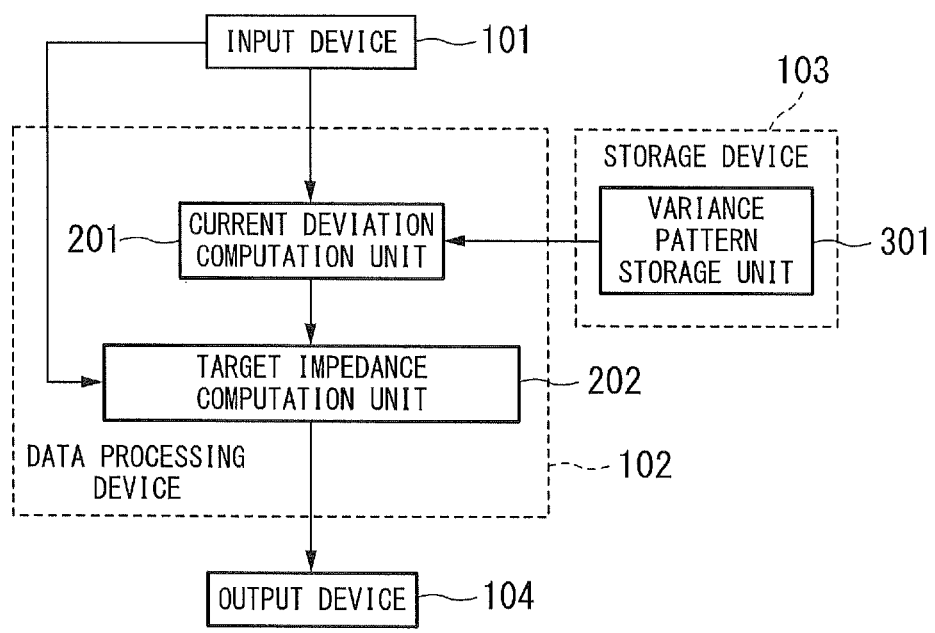
FIG. 1 is a block diagram showing a structure of the power-supply design system as a first embodiment of the present invention.

Below, some embodiments of the power-supply design system of the present invention will be explained in detail with reference to the drawings. In the entire drawings for explaining the embodiments, parts identical to each other generally have identical reference numerals, and duplicate explanations therefor are omitted.

First Embodiment

FIG. 1 is a block diagram showing an example of the structure of the power-supply design system as a first embodiment of the present invention.

As shown in FIG. 1, the power-supply design system includes an input device 101 that may be a keyboard or a mouse, a data processing device 102 that operates by various kinds of programming control, a storage device 103 that stores various kinds of information, and an output device 104 implemented as a display device or a printing device.

The input device 101 is a device used for inputting circuit information to the system, where the information may include the kind of a circuit as a target for circuit simulation in an electronic equipment apparatus; the maximum and minimum (electric) currents of a power supply of the circuit; a permissible range for variation in the power-supply voltage; and information which indicates a probability of not deviating from the permissible range, or the like.

The storage device 103 is a database which stores various kinds of data, and has a variance pattern storage unit 301 that stores in advance, data of variance patterns (explained later in detail) in accordance with circuit information input from the input device 101.

The data processing device 102 has a current deviation computation unit 201 and a target impedance computation unit 202.

Based on the circuit information (e.g., the kind of the circuit and the maximum and minimum currents) input from the input device 101, the current deviation computation unit 201 retrieves a variance pattern corresponding to the circuit information from the variance pattern storage unit 301, and computes a standard deviation of the (electric) current variation.

The target impedance computation unit 202 receives the standard deviation of the current variation (called "current deviation" below) computed by the current deviation computation unit 201, and also receives the circuit information from the input device 101. Based on the permissible range indicated by the circuit information, the probability of not deviating from the permissible range, and the current deviation, the target impedance computation unit 202 computes the target impedance, and outputs it to the output device 104.

The output device 104 outputs the target impedance computes by the target impedance computation unit 202.

Next, referring to FIG. 1, the entire operation of the power-supply design system in the present embodiment will be explained in detail.

The circuit information which is input via the input device 101 and relates to the power supply of a specific electronic equipment apparatus as a target of the circuit simulation is output to the current deviation computation unit 201 and the target impedance computation unit 202 of the data processing device 102.

Based on the circuit information input from the input device 101, the current deviation computation unit 201 retrieves a variance pattern according to the circuit information from the variance pattern storage unit 301, and computes the standard deviation of the current variation (current deviation $\sigma_i$) by using the retrieved variance pattern.

Figure 2A:
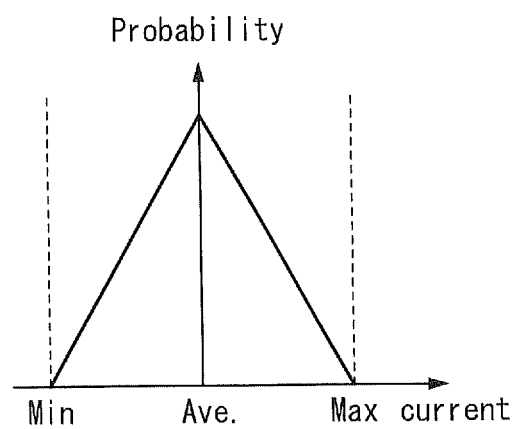
FIG. 2A is a diagram showing a variance pattern for electric current deviation in the embodiment.
Figure 2B:
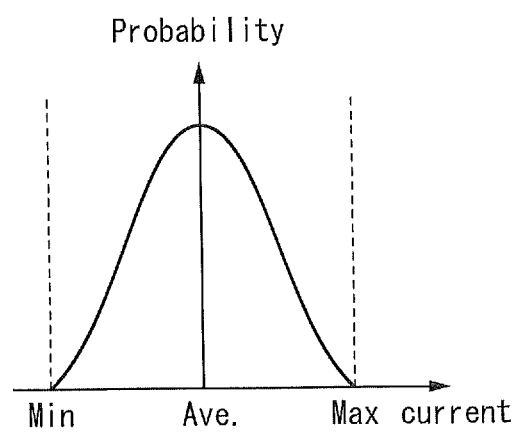
FIG. 2B is a diagram showing another variance pattern for electric current deviation in the embodiment.

For example, the current deviation computation unit 201 retrieves, based on the input circuit information, a variance pattern as shown in FIG. 2A or 2B, from the variance pattern storage unit 301. The variance pattern represents the probability that each value of current flows through the relevant circuit. The value of the current that flows through the circuit varies between the maximum current and the minimum current, where the current deviation can be computed using the following Formula 1 based on the information about the probability about occurrence of each current value between the maximum and the minimum currents.

$$\sigma_i = \sqrt{\int (i-\bar{i})^2 p(i) di}$$ [Formula 1]

For each current value i, $\sigma_i$ indicates the current deviation, $\bar{i}$ with a line thereon indicates an average current, and $p(i)$ denotes an occurrence probability of the current value i.

Accordingly, based on the input data for the maximum and the minimum currents the and also the data of the variance pattern, the current deviation computation unit 201 can compute the current deviation using Formula 1.

The current deviation computation unit 201 may retrieve a predetermined variance pattern from the variance pattern storage unit 301, or may selectively retrieve a predetermined variance pattern according to the circuit information.

That is, each variance pattern may be predetermined according to a variation range of the current and a maximum or minimum current, and the current deviation computation unit 201 may select a variance pattern corresponding to the circuit information. Preferably, optimum combinations between each circuit information item (a variation range of the current and a maximum or minimum current) and each variance pattern are predetermined, and associated pairs of the circuit information item and the variance pattern are stored in advance in the variance pattern storage unit 301.

Next, the target impedance computation unit 202 computes a target impedance as a target. The target impedance computation unit 202 first computes a target voltage deviation $\sigma_v$ based on a permissible voltage variation range and a probability that the voltage does not deviate from the range.

For example, the target impedance computation unit 202 assumes that a variance of the voltage variation to be a standard deviation, and computes a voltage deviation $\sigma_v$ by which a designated probability of not deviating from a designated variation range is obtained. The target impedance computation unit 202 then divides the voltage deviation $\sigma_v$ by the current deviation $\sigma_i$ obtained by the current deviation computation unit 201, thereby computing the target impedance.

The output device 104 communicates information about the target impedance computed by the 202 to a user such as a designer, by showing the information on a display device, or printing the information by means of a printing device.

In accordance with the power-supply design system of the present invention, the current deviation can be computed based on the circuit information, so that a target impedance as a target can be computed via a computation based on a deviation which is one of statistical indexes. Therefore, design is performed based on a clear standard. In other words, in comparison with known power-supply design systems employing a design method which focuses on voltage variation values, the power-supply design system of the present invention performs design that employs a statistical method based on the standard deviation.

In the power-supply design, in order to obtain a voltage variation by analyzing a verification using simulation, impedance of the power supply and information about current variation at a working part of the electronic equipment apparatus are important factors. The relevant current flows when each circuit of the working part operates in the electronic equipment apparatus, and the variation in the current occurs due to a temporal variation about activation and inactivation of each circuit.

However, that produces an extremely complex mode because the activation and inactivation of each circuit are determined by a plurality of entwined circuits. Therefore, in order to obtain a current variation by means of the operation of various kinds of circuits, a huge amount of computation is required. Additionally, since no circuit operation can be obtained in the upper design process which has not yet had detailed circuit operation, no current variation can be obtained by means of the circuit operation.

Therefore, in the power-supply design system of the present invention, the variance patterns about the current variation are stored in a database in advance, and applies a variance pattern to a circuit to be designed, so as to derive a deviation of the current and to perform design.

In addition, relationships between the standard deviation $\sigma_v$ of the voltage variation, the standard deviation $\sigma_i$ of the current variation, and impedance characteristic $z(f)$ at frequency f were examined, a relationship formula between them was obtained as shown below.

$$\frac{\sigma_v}{\sigma_i} = \sqrt{\frac{\int_0^{f_0} z(f)^2 df}{f_a}} \qquad \text{[Formula 2]}$$

where $f_0$ denotes a resonance frequency and $f_a$ indicates a frequency value corresponding to half the frequency at which the current periodically varies in the relevant current variation.

That is, the standard deviation $\sigma_v$ of the voltage variation is a product of the standard deviation $\sigma_i$ of the current variation and the square root of a frequency average of the square of impedance characteristic $z(f)$. Based on the relational formula between the standard deviation $\sigma_v$, the standard deviation $\sigma_i$, and the impedance and the computed target impedance $z_t$, a power-supply impedance can be designed as shown in the following formula, thereby implementing a stable design.

$$z_t \geq \sqrt{\frac{\int_0^{f_0} z(f)^2 df}{f_a}} \qquad \text{[Formula 3]}$$

Second Embodiment

Figure 3:
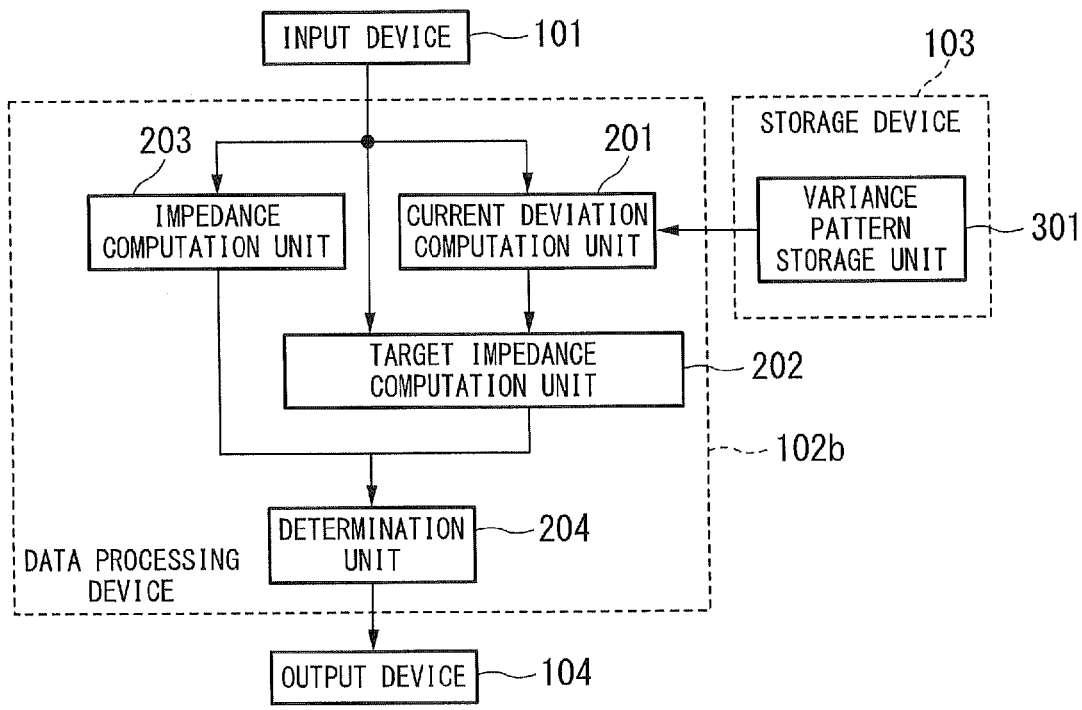
FIG. 3 is a block diagram showing a structure of the power-supply design system as a second embodiment of the present invention.

FIG. 3 is a block diagram showing an example of the structure of the power-supply design system as a second embodiment of the present invention.

In comparison with the power-supply design system of the first embodiment shown in FIG. 1, the power-supply design system of the second embodiment has a distinctive feature in which an impedance computation unit 203 and a determination unit 204 are added to a data processing device 102b, as shown in FIG. 3.

The other parts similar to those in the first embodiment are given identical reference numerals, and detailed explanations thereof are omitted here.

The impedance computation unit 203 computes power-supply impedance characteristics based on circuit information about the power-supply circuit, which is input from the input device 101, by means of a method similar to that applied to ordinary circuit simulators or electromagnetic-field simulators.

The determination unit 204 compares the target impedance input from the target impedance computation unit 202 with a power-supply impedance that is computed using the power-supply impedance characteristics input from the impedance computation unit 203, so as to determine whether or not the power-supply impedance of the power-supply circuit is within a target range. The determination unit 204 then outputs the determined result to the output device 104.

The output device 104 outputs the determined result received from the determination unit 204.

Accordingly, the power-supply design system of the present embodiment can obtain a more direct determination result such as whether or not the power-supply impedance of the power-supply circuit is within a permissible range of the design, thereby performing a more effective design support.

That is, based on the target impedance computed by the target impedance computation unit 202, it is possible to omit a determination, performed by a designer or the like using the circuit information, whether or not the impedance of the power-supply circuit is within a permissible range of the design, and to obtain the target impedance and the determined result.

Third Embodiment

Figure 4:
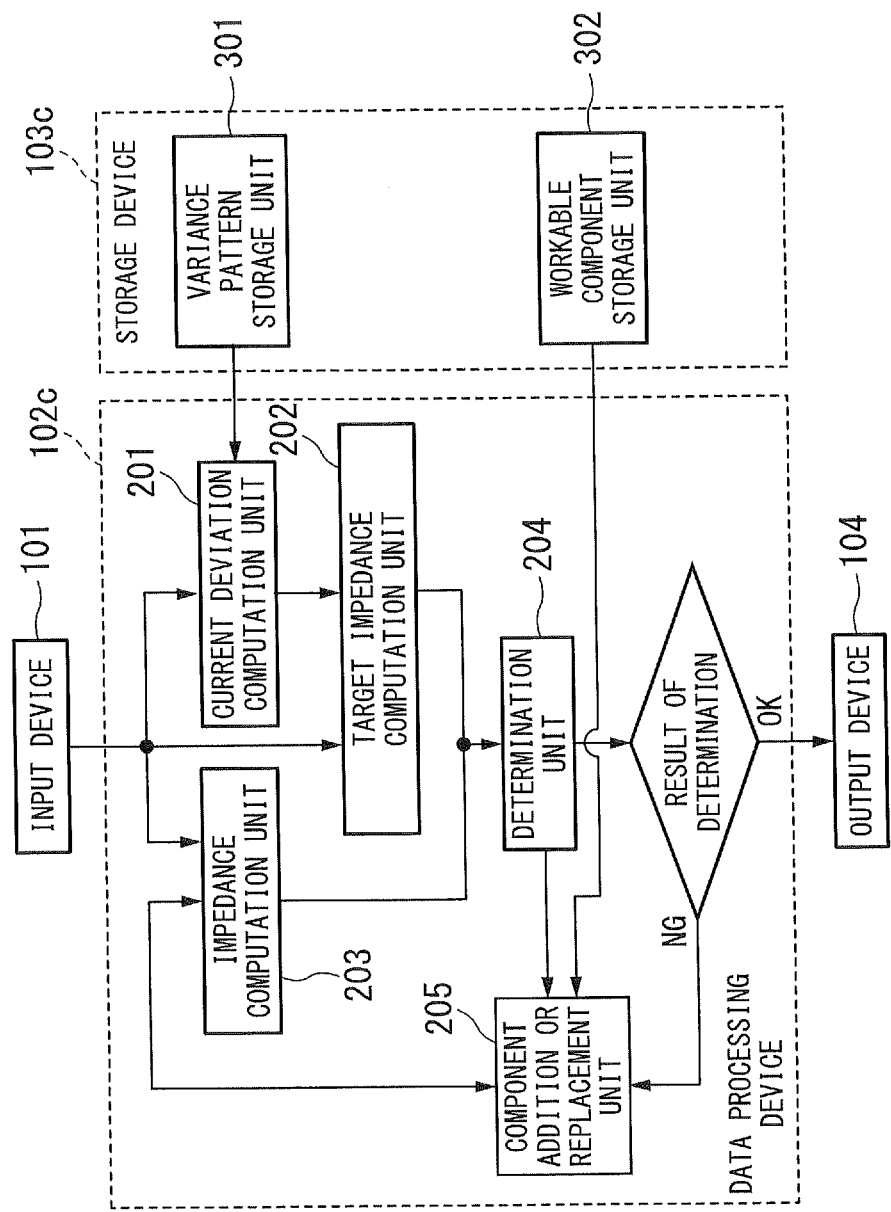
FIG. 4 is a block diagram showing a structure of the power-supply design system as a third embodiment of the present invention.

FIG. 4 is a block diagram showing an example of the structure of the power-supply design system as a third embodiment of the present invention.

In comparison with the power-supply design system of the second embodiment shown in FIG. 3, the power-supply design system of the third embodiment has distinctive features in which a component addition or replacement unit 205 is added in a data processing device 102c and the storage device 103 is replaced with a storage device 103c that has a workable component storage unit 302 in addition to the variance pattern storage unit.

The other parts similar to those in the second embodiment are given identical reference numerals, and detailed explanations thereof are omitted here.

If the result of the determination whether or not the power-supply impedance is within a predetermined range is NO (i.e., the power-supply impedance is not within a predetermined permissible range of the design), the determination unit 204 outputs information (called "NG information") indicating the result, to the component addition or replacement unit 205.

When receiving the NG information from the determination unit 204, the component addition or replacement unit 205 selects a specific component from the workable component storage unit 302 of the storage device 103c, based on the computed result for the impedance characteristics, which is obtained by the impedance computation unit 203. The component addition or replacement unit 205 adds the specific component to the power-supply circuit.

For example, according to the computed result for the impedance characteristics obtained by the impedance computation unit 203, the component addition or replacement unit 205 detects a frequency at which the power-supply impedance has the maximum value, and performs addition of a capacitor suitable for the frequency. That is, for a circuit included in a predetermined electronic equipment apparatus as the target of the relevant simulation, the component addition or replacement unit 205 adds a capacitor (as a design matter) suitable for the frequency at which the power-supply impedance has the maximum value, thereby modifying the circuit information.

The component addition or replacement unit 205 outputs the modified circuit information to the impedance computation unit 203.

Based on the circuit information of the power-supply circuit, to which a component (capacitor) has been added, the impedance computation unit 203 computes the power-supply impedance characteristics again, and output them to the determination unit 204.

In accordance with the power-supply impedance computed based on the changed power-supply impedance characteristics, the determination unit 204 determines again whether or not the voltage variation is within a predetermined range. Regarding whether or not the power-supply impedance is within a permissible range of design, the determination unit 204 may determine whether or not the voltage variation corresponding to the changed power-supply impedance is within a predetermined range for voltage variation, which is indicated by the target impedance.

If the relevant voltage variation is not within the predetermined range indicated by the target impedance, the determination unit 204 outputs NG information, which indicates the determined result, to the component addition or replacement unit 205, and repeats the above-described computation.

In contrast, if the result of the determination unit 204 is OK (i.e., the voltage variation range is within a predetermined range, for example, the voltage variation is within a predetermined voltage variation range indicated by the target impedance), the determination unit 204 makes the output device 104 output power-supply information of the electronic equipment apparatus, which corresponds to the above OK condition. Accordingly, it is possible to automatically support the designer for the power-supply design.

That is, information about the power-supply circuit of an electronic equipment apparatus, by which the voltage variation range is within a predetermined permissible range, can be supplied to the user such as a designer via the output device 104.

Therefore, in the upper design process, the power-supply design can be supported by employing a statistical method in consideration of the outline of the operation of an electronic equipment apparatus so as to compute current deviation, and informs a designer or the like of an impedance as a target by means of simulation.

Fourth Embodiment

FIG. 4 is a block diagram of a fourth embodiment, which is employed when implementing the power-supply design system of the present invention by means of a program. That is, FIG. 5 for the power-supply design system of the fourth embodiment is a diagram for explaining the structure of a program and a computer operated by the program when implementing the power-supply design system of any one of the first to third embodiments as shown in FIGS. 1, 3, and 4 by means of a program.

Figure 5:
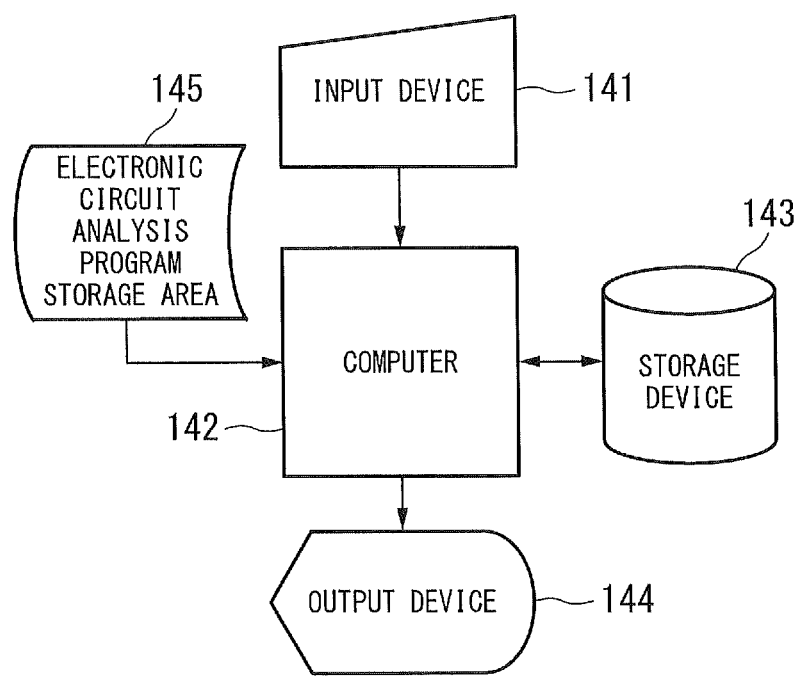
FIG. 5 is a diagram explaining a power-supply design program for the present invention.

The power-supply design system in FIG. 5 has an input device 141, a computer 142, a storage device 143, an output device 144, and an electronic circuit analysis program storage area 145.

More specifically, a program input from the input device 141 is installed in the computer 142 (central processing unit or processor) that implements the functions of, for example, the data processing device 102 in FIG. 1, so as to control the operation of the computer 142.

For example, when a predetermined program input from the input device 141 is installed in the computer 142, the program is stored in the electronic circuit analysis program storage area 145.

In addition, an electronic circuit analysis program stored in the electronic circuit analysis program storage area 145 is loaded on the computer 142, so that information items similar to those stored in the storage device 103 or 103c in the above-described first to third embodiments are produced by operating the storage device 143.

Additionally, in accordance with a control by the electronic circuit analysis program, the computer 142 executes processes identical to those performed by the data processing device 102, 102b, or 102c in the above-described first to third embodiments.

That is, the computer 142 operates in accordance with the electronic circuit analysis program, thereby executing processes identical to those performed by the data processing device 102, 102b, or 102c in the first to third embodiments. In addition, the storage device 143 stores information items similar to those stored in the above-described storage device 103 or 103c. Furthermore, the input device 141 and the output device 144 have structures similar to those of the above-described input device 101 and output device 104.

Next, referring to FIG. 4 as an example, a specific example of the operation of the power-supply design system will be explained using FIGS. 6, 7, 8, and 9.

Figure 6:
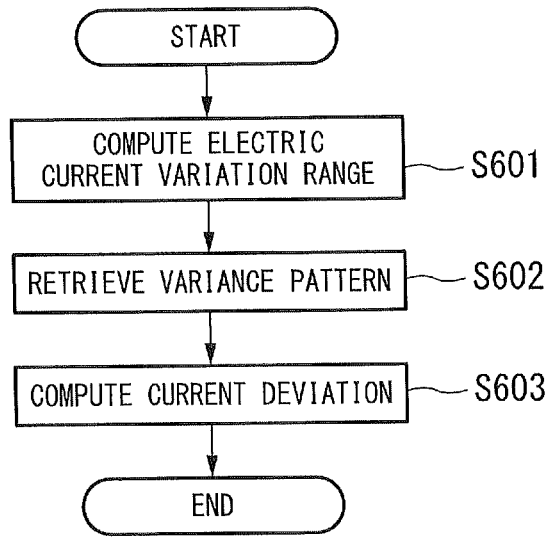
FIG. 6 is a flowchart showing an example of the operation flow for computation of the electric current deviation.
Figure 7:
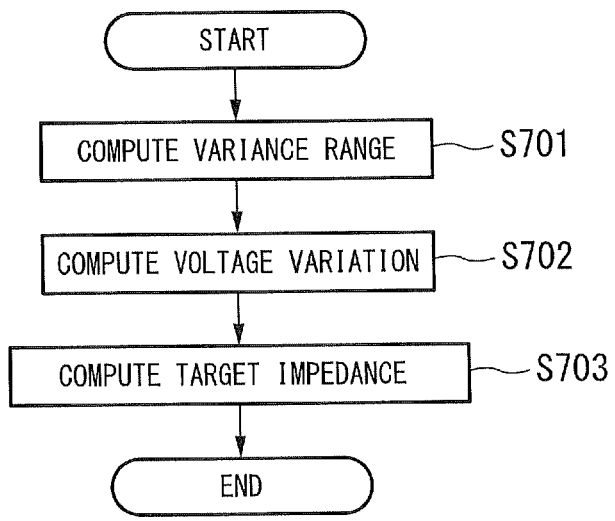
FIG. 7 is a flowchart showing an example of the operation flow for computation of the target impedance.
Figure 8:
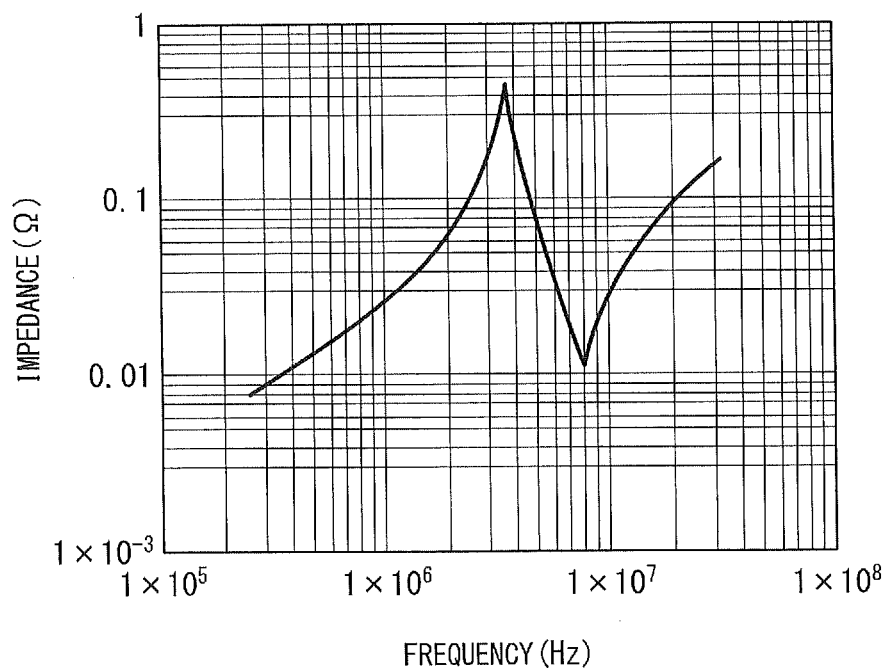
FIG. 8 is a chart showing impedance characteristics obtained in an example of the present invention.
Figure 9:
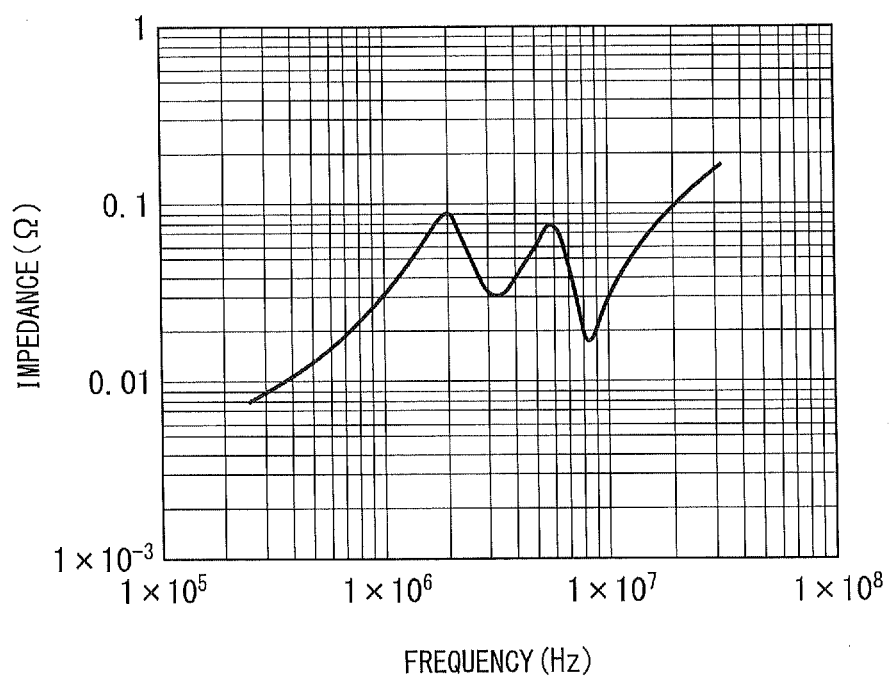
FIG. 9 is a chart showing impedance characteristics obtained by recomputation in an example of the present invention.

FIG. 6 is a flowchart showing a specific example of the operation performed by the current deviation computation unit 201, and FIG. 7 is a flowchart showing a specific example of the operation performed by the target impedance computation unit 202. FIG. 8 is an impedance characteristic chart obtained in an example of the present invention, and FIG. 9 is an impedance characteristic chart obtained by recomputation based on the impedance characteristics shown in FIG. 8. In each chart, the horizontal axis represents frequency (Hz), and the vertical axis represents impedance ($\Omega$).

First, in FIG. 4, circuit information is input by the input device 101, and the information may include the maximum current (100 mA) and the minimum current (75 mA) when an LSI is operating; ±5% (permissible voltage) of input voltage of 1.2V; and a probability of $10^{-9}$ of deviating from the permissible range (i.e., probability that an error occurs). The circuit information also includes information items about capacitors connected to the relevant power supply, such as five capacitors of 0.1 μF and two capacitors of 100 μF.

As shown in the flowchart of FIG. 6, based on the circuit information from the input device 101, the current deviation computation unit 201 computes the current deviation $\sigma_i$.

For example, according to the maximum current (100 mA) and the minimum current (75 mA) included in the input circuit information, the current deviation computation unit 201 computes a current variation range (100 mA−75 mA=25 mA) (see step S601).

The current deviation computation unit 201 then retrieves a variance pattern in accordance with the above maximum current, minimum current, and current variation range, from the variance pattern storage unit 301 (see step S602). In the present example, the current deviation computation unit 201 retrieves a variance pattern as shown in FIG. 2A.

Next, the current deviation computation unit 201 computes the current deviation $\sigma_i$ based on the above current variation range (see step S603). In the case of retrieving the variance pattern of FIG. 2A, the current deviation is $1/\sqrt{6}$ as much as the variation range, so that $\sigma_i$ is computed to be 10 mA.

Next, based on the current deviation $\sigma_i$ computed by the current deviation computation unit 201 and the circuit information input from the input device 101, the target impedance computation unit 202 computes a target impedance as a target.

The target impedance computation unit 202 computes the target impedance under an assumption that the voltage variation follows a normal distribution. In this process, the communication terminal 200 computes a standard deviation by which the probability of deviating from the permissible range (i.e., an error occurs) coincides with the input probability.

For example, when the voltage variation follows the normal distribution, the probability of deviating from the range of ±6.1σ is the above-described input probability of $10^{-9}$ (see step S701). Here, since "1.2V×±5%=60 mV" is 6.1σ, the target impedance computation unit 202 computes 9.8 mV as the voltage deviation $\sigma_v$ as a target for the computation (see step S702).

That is, the target impedance computation unit 202 computes a target impedance of 0.98Ω based on the current deviation $\sigma_i$ and the voltage variation $\sigma_v$, (see step S703).

Next, the impedance computation unit 203 computes the power-supply impedance characteristics. More specifically, in accordance with characteristics (called "component data" below) about power-supply components (i.e., components included in an electronic circuit in the circuit information) and connection information, which are included in the circuit information input from the input device 101, the impedance computation unit 203 generates model data (called an "equivalent circuit model" below) of an equivalent circuit represented based on such circuit information items.

The impedance computation unit 203 performs a circuit simulation based on the generated equivalent circuit model, thereby computing the power-supply impedance characteristics. FIG. 8 shows results (i.e., obtained impedance characteristics) of the circuit simulation executed by the impedance computation unit 203 based on the input circuit information.

Based on the target impedance computed by the target impedance computation unit 202 and the power-supply impedance characteristics computed by the impedance computation unit 203, the determination unit 204 determines whether or not the power-supply impedance is within a permissible range indicated by the target impedance.

That is, based on the power-supply impedance characteristics computed by the impedance computation unit 203, the determination unit 204 computes a power-supply impedance corresponding to "$\sigma_v/\sigma_i$" by using the above-described formula (2), which is 1.14Ω here.

As described above, for a target impedance of 0.98Ω, the power-supply impedance corresponding to the input circuit information for the power-supply circuit is 1.14Ω, which is larger than the target impedance. Therefore, the determination unit 204 outputs the NG information.

That is, the permissible range indicated by the target impedance may be a range in which the power-supply impedance is less than or equal to the target impedance.

Since the result of the determination by the determination unit 204 is NG, the component addition or replacement unit 205 performs addition or replacement of a component which forms the power-supply circuit.

Based on the result of computation for the power-supply impedance, executed by the impedance computation unit 203, the component addition or replacement unit 205 selects, for example, a component which effectively functions at around 320 MHz ($3.2 \times 10^6$ Hz) that has a high impedance (e.g., a capacitor of 1 μF) with respect to the impedance characteristics diagram in FIG. 8. The component addition or replacement unit 205 adds the selected component to the power-supply circuit.

Next, based on the modified power-supply circuit, the impedance computation unit 203 computes the power-supply impedance characteristics again. The result of such recomputation is shown in FIG. 9.

Here, the power-supply impedance corresponding to $\sigma_v/\sigma_i$ in Formula (2), which is obtained by the determination unit transmission unit 204, is 0.89 Ω.

Next, the determination unit 204 performs the relevant determination again. Based on the power-supply impedance, characteristics computed by the impedance computation unit 203, the determination unit computes the power-supply impedance corresponding to $\sigma_v/\sigma_i$ by using Formula (2), which is result in 0.89Ω. For the target impedance of 0.98Ω, the power-supply impedance of the input power-supply circuit is 0.89Ω, that is smaller than the target impedance, thereby outputting OK information.

The output device 104 then outputs the circuit information (e.g., information of five "0.1 μF" capacitors, one "1 μF" capacitor, and two "100 μF" capacitors) which brought the "OK" determination result.

In addition, if a component is added or replaced by the component addition or replacement unit 205, the output device 104 outputs circuit information which includes the added or substitute component.

Therefore, based on such power-supply circuit information, the power-supply design system of the present embodiment can provides an appropriate design support for the designer.

While some embodiments and specific examples of the present invention have been explained above, the present invention is not limited to the embodiments and specific examples, and other modifications can be made without departing from the scope of the present invention.

As described above, conventional power-supply design systems are each designed by performing a simulation based on detailed design data. In this case, in the upper design process in which operation of the electronic equipment apparatus has not yet been specified, information items required for the simulation cannot be collected. Additionally, no clear objective can be determined when designing a power supply by means of simulation in the upper design process in which the operation has not yet been specified. Therefore, lots of components more than requires may be added, or the power-supply impedance may become too high to operate normally.

In contrast, in the power-supply design system of the present invention, standard deviation in statistics is applied to the design for the electronic equipment apparatus, where design is performed in accordance with relationships between current deviation, voltage variation, and power-supply impedance.

Accordingly, a target impedance can be obtained based on simplified data, and thus even in the upper design process that does not have detailed infatuation, a clear target value for the power-supply impedance can be obtained, thereby appropriately performing the power-supply design.

The above-described power-supply design method is implemented by a computer which loads a program. Therefore, the steps in each operation of the above-described power-supply design method are stored in a computer-readable storage medium by using a program format. The program is loaded and executed by the computer, so that the above-described operations are executed.

The above computer-readable storage medium is a magnetic disk, magneto optical disk, CD-ROM, DVD-ROM, semiconductor memory, or the like. In addition, the relevant computer program may be provided to a computer via a communication line, and the computer which received the program may execute the program.

In addition, the program may execute a part of the functions in the above-described power-supply design method, or may be a program (so-called "differential program") by which the functions in the above-described power-supply design method can be executed by a combination of this program and an existing program which has already been stored in a computer system.

INDUSTRIAL APPLICABILITY

The power-supply design system of the present invention can be applied, when designing a power supply of an electronic equipment apparatus, to a program by which a computer implements an auxiliary apparatus or automatic design apparatus for power-supply design.

REFERENCE SYMBOLS 101 input device
102 data processing device
103 storage device
104 output device
201 current deviation computation unit
202 target impedance computation unit
203 impedance computation unit
204 determination unit
205 component addition or replacement unit

The invention claimed is:

1. A power-supply design system used for designing a power supply of an electronic equipment apparatus, the system comprising:
an input device used for inputting circuit information about the power supply of the electronic equipment apparatus;
a current deviation computation unit that computes an electric current deviation which indicates an electric current variation of the electronic equipment apparatus, based on the circuit information input using the input device, and dispersion information that indicates a dispersion of an electric current variation, which corresponds to the circuit information;
a target impedance computation unit that computes a target impedance as a target for the power supply indicated by the circuit information, based on the electric current deviation computed by the current deviation computation unit and a permissible range of a voltage variation, where the permissible range is indicated by the circuit information; and
an output device that outputs the target impedance computed by the target impedance computation unit.

2. The power-supply design system in accordance with claim 1, further comprising:
an impedance computation unit that computes power-supply impedance characteristics of the power supply of the electronic equipment apparatus, based on the circuit information input using the input device; and
a determination unit that determines, based on the target impedance computed by the target impedance computation unit, whether or not a power-supply impedance computed based on the power-supply impedance characteristics is within a permissible range indicated by the target impedance,
wherein, based on a result of the determination by the determination unit, the output device outputs information that indicates whether or not the power-supply impedance is within a permissible range for the circuit information.

3. The power-supply design system in accordance with claim 2, further comprising:
a component addition or replacement unit that performs a control such as addition or replacement of a component which forms the electronic equipment apparatus and corresponds to the circuit information if the power-supply impedance is not within the permissible range for the circuit information, so that the power-supply impedance is within the permissible range for the circuit information,
wherein, according to a result of the control by the component addition or replacement unit, the output device outputs power-supply design information about design control required for the power-supply impedance to be within the permissible range for the circuit information.

4. The power-supply design system in accordance with claim 1, wherein the electric current deviation includes one of statistical indexes.

5. The power-supply design system in accordance with claim 1, wherein, in said designing of the power supply, the power-supply design system applies a statistical method based on a standard deviation.

6. The power-supply design system in accordance with claim 1, further comprising a database for storing variance patterns about the electric current variation in advance of said designing of the power supply, such that the power-supply design system applies a variance pattern to a circuit to derive the electric current deviation.

7. A power-supply design system used for designing a power supply of an electronic equipment apparatus, the system comprising:
an input device used for inputting circuit information about the power supply of the electronic equipment apparatus;
a variance storage unit that stores variance information which indicates an occurrence probability for electric current within a variation range of the electric current;
a current deviation computation unit that computes an electric current deviation which indicates an electric current variation of the electronic equipment apparatus, based on the variance information and an electric current occurrence range indicated by the circuit information input using the input device;
a target impedance computation unit that computes a target impedance as a target for the power supply, based on the electric current deviation computed by the current deviation computation unit and a permissible range of a voltage variation of the electronic equipment apparatus, where the permissible range is indicated by the circuit information; and an output device that outputs the target impedance computed by the target impedance computation unit.

8. The power-supply design system in accordance with claim 7, further comprising:

an impedance computation unit that computes power-supply impedance characteristics of the power supply of the electronic equipment apparatus, based on the circuit information input using the input device; and a determination unit that determines, based on the target impedance computed by the target impedance computation unit, whether or not a power-supply impedance computed based on the power-supply impedance characteristics is within a permissible range indicated by the target impedance, wherein, based on a result of the determination by the determination unit, the output device outputs information that indicates whether or not the power-supply impedance is within a permissible range for the circuit information.

9. The power-supply design system in accordance with claim 8, further comprising:

a component addition or replacement unit that performs a control such as addition or replacement of a component which forms the electronic equipment apparatus and corresponds to the circuit information if the power-supply impedance is not within the permissible range for the circuit information, so that the power-supply impedance is within the permissible range for the circuit information, wherein, according to a result of the control by the component addition or replacement unit, the output device outputs power-supply design information about design control required for the power-supply impedance to be within the permissible range for the circuit information.

10. The power-supply design system in accordance with claim 7, wherein the electric current deviation includes one of statistical indexes.

11. The power-supply design system in accordance with claim 7, wherein, in said designing of the power supply, the power-supply design system applies a statistical method based on a standard deviation.

12. The power-supply design system in accordance with claim 7, further comprising a database for storing variance patterns about the electric current variation in advance of said designing of the power supply, such that the power-supply design system applies a variance pattern to a circuit to derive the electric current deviation.

13. A power-supply design method used for designing a power supply of an electronic equipment apparatus, the method comprising:

inputting circuit information about the power supply of the electronic equipment apparatus;

computing an electric current deviation which indicates an electric current variation of the electronic equipment apparatus, based on the circuit information and dispersion information that indicates a dispersion of an electric current variation, which corresponds to the circuit information;

computing a target impedance as a target for the power supply indicated by the circuit information, based on the electric current deviation and a permissible range of a voltage variation, where the permissible range is indicated by the circuit information; and outputting the target impedance, wherein at least one of said inputting circuit information, said computing the electric current deviation, said computing the target impedance, and said outputting the target impedance is executed by using a computer.

14. The method in accordance with claim 13, wherein the electric current deviation includes one of statistical indexes such that a statistical method is applied based on a standard deviation.

15. The method in accordance with claim 13, further comprising:

storing variance patterns about the electric current variation in a database in advance of said designing of the power supply, such that in the power-supply design method, a variance pattern is applied to a circuit to derive the electric current deviation.

16. A non-transitory computer-readable storage medium which stores a power-supply design program used for making a computer execute said inputting circuit information, said computing the electric current deviation, said computing the target impedance, and said outputting the target impedance in claim 13.

17. A power-supply design method used for designing a power supply of an electronic equipment apparatus, the method comprising:

inputting circuit information about the power supply of the electronic equipment apparatus;

computing an electric current deviation which indicates an electric current variation of the electronic equipment apparatus, based on variance information which indicates an occurrence probability for electric current within a variation range of the electric current, and on an electric current occurrence range indicated by the circuit information;

computing a target impedance as a target for the power supply, based on the electric current deviation and a permissible range of a voltage variation of the electronic equipment apparatus, where the permissible range is indicated by the circuit information; and outputting the target impedance, wherein at least one of said inputting circuit information, said computing the electric current deviation, said computing the target impedance, and said outputting the target impedance is executed by using a computer.

18. The method in accordance with claim 17, wherein the electric current deviation includes one of statistical indexes such that a statistical method is applied based on a standard deviation.

19. The method in accordance with claim 17, further comprising:

storing variance patterns about the electric current variation in a database in advance of said designing of the power supply, such that in the power-supply design method, a variance pattern is applied to a circuit to derive the electric current deviation.

20. A non-transitory computer-readable storage medium which stores a power-supply design program used for making a computer execute said inputting circuit information, said computing the electric current deviation, said computing the target impedance, and said outputting the target impedance in claim 17.

* * * * *